(12) United States Patent
Rawat

(10) Patent No.: US 11,704,333 B2
(45) Date of Patent: Jul. 18, 2023

(54) FORM TEXT EXTRACTION OF KEY/VALUE PAIRS

(71) Applicant: Schlumberger Technology Corporation, Sugar Land, TX (US)

(72) Inventor: Pradeep Singh Rawat, Ghaziabad UP (IN)

(73) Assignee: Schlumberger Technology Corporation, Sugar Land, TX (US)

( * ) Notice: Subject to any disclaimer, the term of this patent is extended or adjusted under 35 U.S.C. 154(b) by 105 days.

(21) Appl. No.: 16/912,682

(22) Filed: Jun. 25, 2020

(65) Prior Publication Data

US 2021/0073534 A1 Mar. 11, 2021

Related U.S. Application Data

(60) Provisional application No. 62/899,103, filed on Sep. 11, 2019.

(51) Int. Cl.
| | |
|---|---|
| *G06V 30/416* | (2022.01) |
| *G06F 40/137* | (2020.01) |
| *G06F 16/31* | (2019.01) |
| *G06F 40/117* | (2020.01) |
| *G06F 40/177* | (2020.01) |
| *G06F 40/106* | (2020.01) |
| *G06V 30/414* | (2022.01) |
| *G06F 16/25* | (2019.01) |
| *G06V 30/10* | (2022.01) |

(52) U.S. Cl.
CPC .......... *G06F 16/258* (2019.01); *G06F 16/316* (2019.01); *G06F 40/106* (2020.01); *G06F 40/117* (2020.01); *G06F 40/137* (2020.01); *G06F 40/177* (2020.01); *G06V 30/414* (2022.01); *G06V 30/416* (2022.01); *G06V 30/10* (2022.01)

(58) Field of Classification Search
CPC .. G06V 30/416; G06V 30/414; G06F 16/316; G06F 40/106; G06F 40/117; G06F 40/137; G06F 40/177
USPC ........................................................ 382/229
See application file for complete search history.

(56) References Cited

U.S. PATENT DOCUMENTS

| | | | |
|---|---|---|---|
| 7,350,142 B2 * | 3/2008 | Kraft ................... | G06F 40/106 |
| | | | 715/210 |
| 10,839,245 B1 * | 11/2020 | Dhillon ............... | G06V 30/414 |
| 10,902,952 B2 * | 1/2021 | Lucas .................. | G06V 30/418 |
| 11,216,425 B2 * | 1/2022 | Pisipati ................ | G06F 16/258 |
| 2011/0249905 A1 * | 10/2011 | Singh .................. | G06V 30/412 |
| | | | 382/225 |

(Continued)

FOREIGN PATENT DOCUMENTS

KR          102152260 B1 *  9/2020    ............. G06V 30/40

*Primary Examiner* — Stephen S Hong
*Assistant Examiner* — Broderick C Anderson
(74) *Attorney, Agent, or Firm* — Michael Guthrie

(57) ABSTRACT

A computer-implemented method, apparatus and program product use the spatial locations of words identified in an unstructured document to both reconstruct lines in the unstructured document and vertically partition the unstructured document. Key/value pairs may then be generated from one or more of the reconstructed lines by using one or more words to one side of the vertical partition as keys and using one or more words to the other side of the vertical partition as values.

19 Claims, 11 Drawing Sheets

(56) References Cited

U.S. PATENT DOCUMENTS

2016/0063322 A1\* 3/2016 Déjean ................ G06V 30/412
                                                382/176
2019/0171875 A1\* 6/2019 Northrup ............... G06F 40/30
2019/0340240 A1\* 11/2019 Duta ..................... G06V 30/15

\* cited by examiner

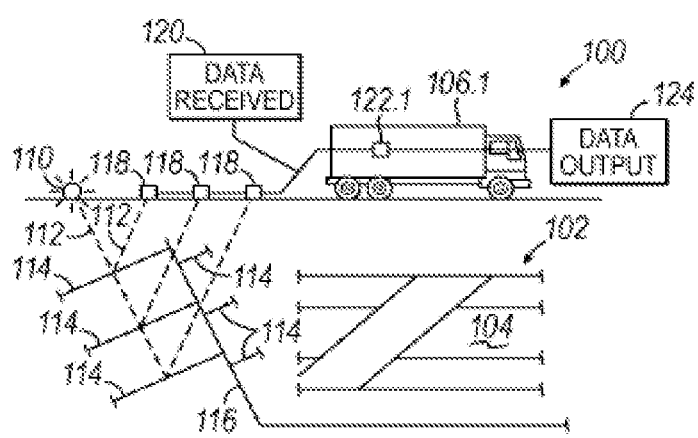
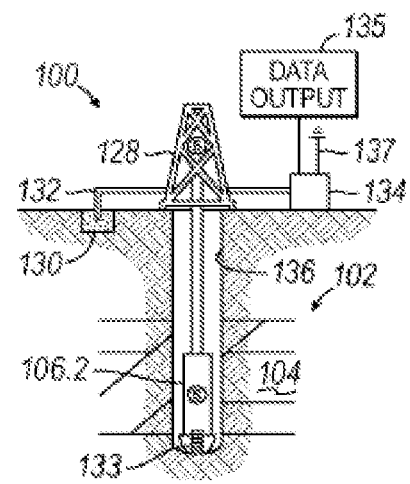
FIG. 2A  FIG. 2B
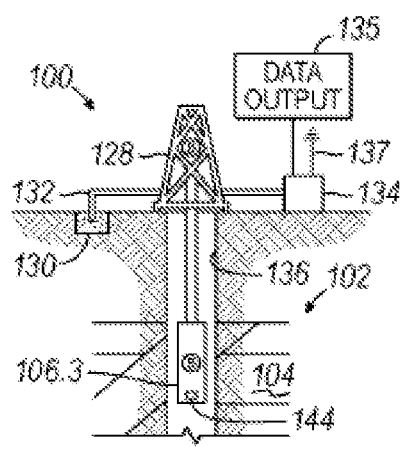
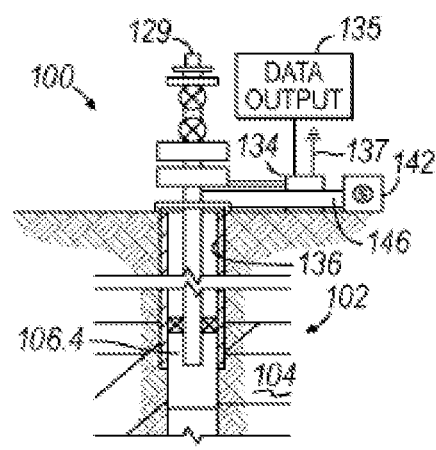
FIG. 2C  FIG. 2D

WELL DATA: 442

Distance from rig floor to sea level:     22 m

Water depth (MSL):                         344 m

Setting (RKB) depth for conductor:         428 m

Leak Off / Formation Integrity Test (g/cc):    N/A

Setting Depth (RKB) for BOP casing:        1309m

Leak Off / Formation Integrity Test (g/cc):    1.53 (LOT)

Depth (m RKB & two way time to formation/section/layer tops:
Top Pliocene:                              517 m/633 ms
Base Pliocene:                             517 m/633 ms
Base Nordland Gr.:                         517 m/633 ms

WELL DATA:

| | |
|---|---|
| Distance from rig floor to sea level: | 22 m |
| Water depth (MSL): | 344 m |
| Setting (RKB) depth for conductor: | 428 m |
| Leak Off / Formation Integrity Test (g/cc): | N/A |
| Setting Depth (RKB) for BOP casing: | 1309m |
| Leak Off / Formation Integrity Test (g/cc): | 1.53 (LOT) |

Depth (m RKB & two way time to formation/section/layer tops:
Top Pliocene:           517 m/633 ms
Base Pliocene:          517 m/633 ms
Base Nordland Gr.:      517 m/633 ms

FIG. 12B

WELL DATA:

| | |
|---|---|
| Distance from rig floor to sea level: | 22 m |
| Water depth (MSL): | 344 m |
| Setting (RKB) depth for conductor: | 428 m |
| Leak Off / Formation Integrity Test (g/cc): | N/A |
| Setting Depth (RKB) for BOP casing: | 1309m |
| Leak Off / Formation Integrity Test (g/cc): | 1.53 (LOT) |

Depth (m RKB & two way time to formation/section/layer tops:
Top Pliocene:           517 m/633 ms
Base Pliocene:          517 m/633 ms
Base Nordland Gr.:      517 m/633 ms

FIG. 12C

FORM TEXT EXTRACTION OF KEY/VALUE PAIRS

CROSS REFERENCE TO RELATED APPLICATIONS

This application claims the benefit of priority to U.S. Provisional Patent Application 62/899,103, filed on Sep. 11, 2019, the entire content of which is incorporated herein by reference.

BACKGROUND

Many industries generate a huge amount of data each day, including, for example, the oil & gas industry. The information extracted from this data often drives decision making, and many decisions rely on accurate data and information.

Data generated in such industries often may be classified into structured data and unstructured data, the former of which includes data that is organized in a manner such that the meaning of the data can be directly ascertained, particularly where the data is stored in a fixed format, e.g., in specific fields in database records or files. Unstructured data, in contrast, is data for which the meaning of that data is not directly ascertainable from the data itself or the document within which it is contained.

In the oil & gas industry, for example, vast amounts of data collected from wells and other production equipment may be produced on a daily basis, and may be stored in unstructured documents, e.g., well & log data, spatial data, reports and documents relating to drilling, reservoir, production, etc., study reports, analytical reports, etc. In many cases, for example, such data is produced on reports that are scanned in as images in order to be stored, retrieved, and analyzed.

For documents that are scanned into a computer system, optical character recognition technology may be used to generate text from images of textual data. However, the meaning of that text can be difficult to ascertain and to extract from the documents. In the oil & gas industry, for example, many documents include information about wells in the form of forms, passages, tables, etc. Forms summarize these documents and may include highly valuable information about the wells. Conventionally, extracting information from these documents is a highly tedious and human error-prone task, even when optical character recognition is used to generate text from the documents. Often a skilled individual having knowledge of the particular meaning of the data is needed to accurately extract information from unstructured documents. A need therefore continues to exist in the art for a manner of automating the extraction of information from unstructured documents.

SUMMARY

The embodiments disclosed herein provide a method, apparatus, and program product that use the spatial locations of words identified in an unstructured document to both reconstruct lines in the unstructured document and vertically partition the unstructured document. Key/value pairs may then be generated from one or more of the reconstructed lines by using one or more words to one side of the vertical partition as keys and using one or more words to the other side of the vertical partition as values.

Therefore, consistent with one aspect of the invention, a method of extracting text from an unstructured document may include determining respective spatial locations of a plurality of words identified in the unstructured document, reconstructing a plurality of lines from the unstructured document based upon the determined spatial locations of the plurality of words, generating a vertical partition for the unstructured document based upon the determined spatial locations of the plurality of words, and generating a plurality of key/value pairs from one or more of the plurality of lines, including, for each line among the one or more lines, assigning one or more words located on one side of the vertical partition as a key for the key/value pair for the line and assigning one or more words located on another side of the vertical partition as a value for the key/value pair for the line.

Some embodiments may also include receiving the unstructured document as an image, and performing optical character recognition on the image to identify the plurality of words in the unstructured document. In addition, some embodiments may further include, after reconstructing the plurality of lines, sorting the plurality of lines based upon respective vertical coordinates associated with the plurality of lines and sorting the words in each line based upon respective horizontal coordinates associated with the words in each line.

Also, in some embodiments, reconstructing the plurality of lines includes processing each of the plurality of words by assigning such word to an existing line if such word vertically overlaps the existing line and creating a new line if such word does not overlap an existing line. Further, in some embodiments, reconstructing the plurality of lines includes determining a vertical coordinate for each line from the vertical coordinates of the words assigned to such line.

In some embodiments, generating the vertical partition includes organizing the plurality of words into text blocks, traversing the unstructured document to determine an amount of overlap of text blocks for each of a plurality of horizontal positions, and positioning the vertical partition at a horizontal position having a minimum amount of overlap. In addition, in some embodiments, the amount of overlap at each horizontal position is determined based upon a number of text blocks overlapped at such horizontal position and a vertical dimension of each overlapping text block. In some embodiments, positioning the vertical partition further includes positioning the vertical partition at a horizontal position having a minimum amount of overlap and having regions of higher overlap on each side of the horizontal position.

In addition, in some embodiments, words located to the left of the vertical partition are keys and words located to the right of the vertical partition are values. In addition, some embodiments may further include, for a line among the plurality of lines having no words located to the left of the vertical partition, assigning one or more words to the right of the vertical partition as at least a part of a value for a key/value pair for a preceding line in the unstructured document. Some embodiments may also include outputting the plurality of key/value pairs in a JavaScript Object Notation format.

Some embodiments may also include an apparatus including at least one processing unit and program code configured upon execution by the at least one processing unit to perform any of the aforementioned methods. Some embodiments may also include a program product including a computer readable medium and program code stored on the computer readable medium and configured upon execution by at least one processing unit to perform any of the aforementioned methods.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

BRIEF DESCRIPTION OF THE DRAWINGS

FIGS. 2A-2D illustrate simplified, schematic views of an oilfield having subterranean formations containing reservoirs therein in accordance with implementations of various technologies and techniques described herein.

FIGS. 7, 8, 9, 10, 11, 12A-12D, 13, 14 and 15 illustrate various steps in the flowchart of FIG. 6 on example unstructured documents.

DETAILED DESCRIPTION

The herein-described embodiments provide a method, apparatus, and program product that use the spatial locations of words identified in an unstructured document to both reconstruct lines in the unstructured document and vertically partition the unstructured document. Key/value pairs may then be generated from one or more of the reconstructed lines by using one or more words to one side of the vertical partition as keys and using one or more words to the other side of the vertical partition as values.

Other variations and modifications will be apparent to one of ordinary skill in the art, as will become more apparent below. However, an overview of an example technical environment, as well as oilfield operations, will be provide prior to further discussing the various technologies and techniques disclosed herein.

Hardware and Software Environment

Figure 1:
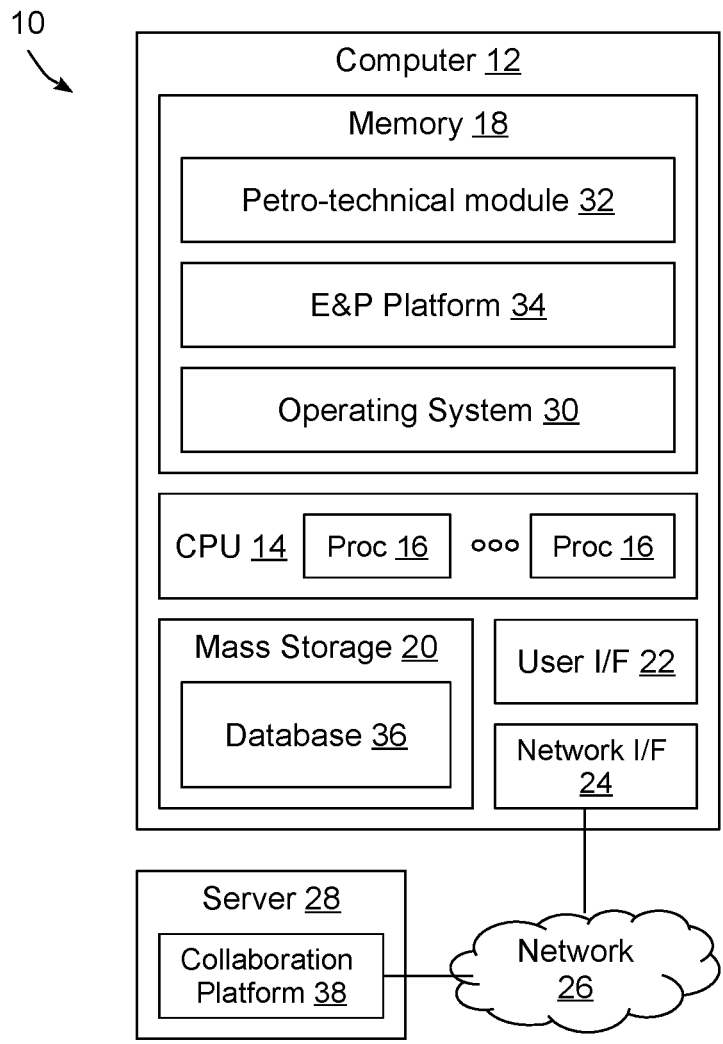
FIG. 1 is a block diagram of an example hardware and software environment for a data processing system in accordance with implementation of various technologies and techniques described herein.

Turning now to the drawings, wherein like numbers denote like parts throughout the several views, FIG. 1 illustrates an example data processing system 10 in which the various technologies and techniques described herein may be implemented. System 10 is illustrated as including one or more computers 12, e.g., client computers, each including a central processing unit (CPU) 14 including at least one hardware-based processor or processing core 16. CPU 14 is coupled to a memory 18, which may represent the random access memory (RAM) devices comprising the main storage of a computer 12, as well as any supplemental levels of memory, e.g., cache memories, non-volatile or backup memories (e.g., programmable or flash memories), read-only memories, etc. In addition, memory 18 may be considered to include memory storage physically located elsewhere in a computer 12, e.g., any cache memory in a microprocessor or processing core, as well as any storage capacity used as a virtual memory, e.g., as stored on a mass storage device 20 or on another computer coupled to a computer 12.

Each computer 12 also generally receives a number of inputs and outputs for communicating information externally. For interface with a user or operator, a computer 12 generally includes a user interface 22 incorporating one or more user input/output devices, e.g., a keyboard, a pointing device, a display, a printer, etc. Otherwise, user input may be received, e.g., over a network interface 24 coupled to a network 26, from one or more external computers, e.g., one or more servers 28 or other computers 12. A computer 12 also may be in communication with one or more mass storage devices 20, which may be, for example, internal hard disk storage devices, external hard disk storage devices, storage area network devices, etc.

A computer 12 generally operates under the control of an operating system 30 and executes or otherwise relies upon various computer software applications, components, programs, objects, modules, data structures, etc. For example, a petro-technical module or component 32 executing within an exploration and production (E&P) platform 34 may be used to access, process, generate, modify or otherwise utilize petro-technical data, e.g., as stored locally in a database 36 and/or accessible remotely from a collaboration platform 38. Collaboration platform 38 may be implemented using multiple servers 28 in some implementations, and it will be appreciated that each server 28 may incorporate a CPU, memory, and other hardware components similar to a computer 12.

In one non-limiting embodiment, for example, E&P platform 34 may implemented as the PETREL Exploration & Production (E&P) software platform, while collaboration platform 38 may be implemented as the STUDIO E&P KNOWLEDGE ENVIRONMENT platform, both of which are available from Schlumberger Ltd. and its affiliates. It will be appreciated, however, that the techniques discussed herein may be utilized in connection with other platforms and environments, so the invention is not limited to the particular software platforms and environments discussed herein.

It will be appreciated that the herein-described techniques may be implemented in a number of different computers, computer systems, devices, etc. In some embodiments, the herein-described techniques may be implemented within a production computer. In other embodiments, the implementation may be within an on-site computer at an oil field, within a pump itself (e.g. a smart pump), in a well or pump controller, in a cloud service, in a remote server, in another computer or electric device, or in various combinations thereof.

In general, the routines executed to implement the embodiments disclosed herein, whether implemented as part of an operating system or a specific application, component, program, object, module or sequence of instructions, or even a subset thereof, will be referred to herein as "computer program code," or simply "program code." Program code generally comprises one or more instructions that are resident at various times in various memory and storage devices in a computer, and that, when read and executed by one or more hardware-based processing units in a computer (e.g., microprocessors, processing cores, or other hardware-based circuit logic), cause that computer to perform the steps embodying desired functionality. Moreover, while embodiments have and hereinafter will be described in the context of fully functioning computers and computer systems, those skilled in the art will appreciate that the various embodiments are capable of being distributed as a program product in a variety of forms, and that the invention applies equally regardless of the particular type of computer readable media used to actually carry out the distribution.

Such computer readable media may include computer readable storage media and communication media. Computer readable storage media is non-transitory in nature, and may include volatile and non-volatile, and removable and non-removable media implemented in any method or technology for storage of information, such as computer-readable instructions, data structures, program modules or other data. Computer readable storage media may further include RAM, ROM, erasable programmable read-only memory (EPROM), electrically erasable programmable read-only memory (EEPROM), flash memory or other solid state memory technology, CD-ROM, DVD, or other optical storage, magnetic cassettes, magnetic tape, magnetic disk storage or other magnetic storage devices, or any other medium that can be used to store the desired information and which can be accessed by computer 10. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

Various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Furthermore, it will be appreciated by those of ordinary skill in the art having the benefit of the instant disclosure that the various operations described herein that may be performed by any program code, or performed in any routines, workflows, or the like, may be combined, split, reordered, omitted, and/or supplemented with other techniques known in the art, and therefore, the invention is not limited to the particular sequences of operations described herein.

Those skilled in the art will recognize that the example environment illustrated in FIG. 1 is not intended to limit the invention. Indeed, those skilled in the art will recognize that other alternative hardware and/or software environments may be used without departing from the scope of the invention.

Oilfield Operations

FIGS. 2A-2D illustrate simplified, schematic views of an oilfield 100 having subterranean formation 102 containing reservoir 104 therein in accordance with implementations of various technologies and techniques described herein. FIG. 2A illustrates a survey operation being performed by a survey tool, such as seismic truck 106.1, to measure properties of the subterranean formation. The survey operation is a seismic survey operation for producing sound vibrations. In FIG. 2A, one such sound vibration, sound vibration 112 generated by source 110, reflects off horizons 114 in earth formation 116. A set of sound vibrations is received by sensors, such as geophone-receivers 118, situated on the earth's surface. The data received 120 is provided as input data to a computer 122.1 of a seismic truck 106.1, and responsive to the input data, computer 122.1 generates seismic data output 124. This seismic data output may be stored, transmitted or further processed as desired, for example, by data reduction.

FIG. 2B illustrates a drilling operation being performed by drilling tools 106.2 suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud may be filtered and returned to the mud pit. A circulating system may be used for storing, controlling, or filtering the flowing drilling muds. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produces data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106.2 may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Generally, the wellbore is drilled according to a drilling plan that is established prior to drilling. The drilling plan sets forth equipment, pressures, trajectories and/or other parameters that define the drilling process for the wellsite. The drilling operation may then be performed according to the drilling plan. However, as information is gathered, the drilling operation may need to deviate from the drilling plan. Also, as drilling or other operations are performed, the subsurface conditions may change. The earth model may also need adjustment as new information is collected.

The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize portions of the field operation, such as controlling drilling, weight on bit, pump rates, or other parameters. These adjustments may be made automatically based on computer protocol, and/or manually by an operator. In some cases, well plans may be adjusted to select optimum operating conditions, or to avoid problems.

FIG. 2C illustrates a wireline operation being performed by wireline tool 106.3 suspended by rig 128 and into wellbore 136 of FIG. 2B. Wireline tool 106.3 is adapted for deployment into wellbore 136 for generating well logs, performing downhole tests and/or collecting samples. Wireline tool 106.3 may be used to provide another method and apparatus for performing a seismic survey operation. Wireline tool 106.3 may, for example, have an explosive, radioactive, electrical, or acoustic energy source 144 that sends and/or receives electrical signals to surrounding subterranean formations 102 and fluids therein.

Wireline tool 106.3 may be operatively connected to, for example, geophones 118 and a computer 122.1 of a seismic truck 106.1 of FIG. 2A. Wireline tool 106.3 may also provide data to surface unit 134. Surface unit 134 may collect data generated during the wireline operation and may produce data output 135 that may be stored or transmitted. Wireline tool 106.3 may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106.3 to measure downhole parameters which relate to, for example porosity, permeability, fluid composition and/or other parameters of the field operation.

FIG. 2D illustrates a production operation being performed by production tool 106.4 deployed from a production unit or Christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106.4 or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 2B-2D illustrate tools used to measure properties of an oilfield, it will be appreciated that the tools may be used in connection with non-oilfield operations, such as gas fields, mines, aquifers, storage, or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 2A-2D are intended to provide a brief description of an example of a field usable with oilfield application frameworks. Part, or all, of oilfield 100 may be on land, water, and/or sea. Also, while a single field measured at a single location is depicted, oilfield applications may be utilized with any combination of one or more oilfields, one or more processing facilities and one or more wellsites.

Figure 3:
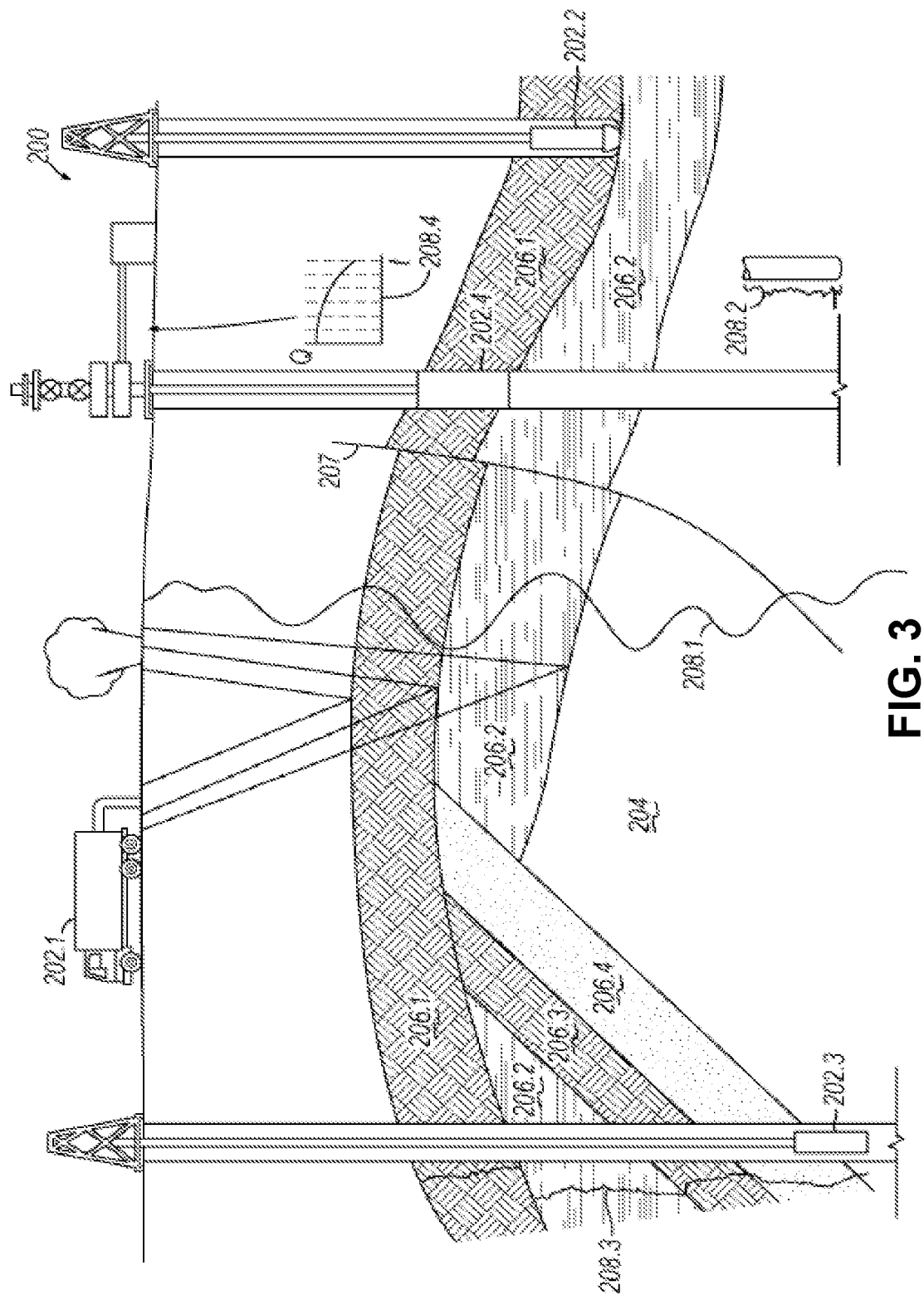
FIG. 3 illustrates a schematic view, partially in cross section of an oilfield having a plurality of data acquisition tools positioned at various locations along the oilfield for collecting data from the subterranean formations in accordance with implementations of various technologies and techniques described herein.

FIG. 3 illustrates a schematic view, partially in cross section of oilfield 200 having data acquisition tools 202.1, 202.2, 202.3 and 202.4 positioned at various locations along oilfield 200 for collecting data of subterranean formation 204 in accordance with implementations of various technologies and techniques described herein. Data acquisition tools 202.1-202.4 may be the same as data acquisition tools 106.1-106.4 of FIGS. 2A-2D, respectively, or others not depicted. As shown, data acquisition tools 202.1-202.4 generate data plots or measurements 208.1-208.4, respectively. These data plots are depicted along oilfield 200 to demonstrate the data generated by the various operations.

Data plots 208.1-208.3 are examples of static data plots that may be generated by data acquisition tools 202.1-202.3, respectively, however, it should be understood that data plots 208.1-208.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208.1 is a seismic two-way response over a period of time. Static plot 208.2 is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208.3 is a logging trace that generally provides a resistivity or other measurement of the formation at various depths.

A production decline curve or graph 208.4 is a dynamic data plot of the fluid flow rate over time. The production decline curve generally provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. The static and dynamic measurements may be analyzed and used to generate models of the subterranean formation to determine characteristics thereof. Similar measurements may also be used to measure changes in formation aspects over time.

The subterranean structure 204 has a plurality of geological formations 206.1-206.4. As shown, this structure has several formations or layers, including a shale layer 206.1, a carbonate layer 206.2, a shale layer 206.3 and a sand layer 206.4. A fault 207 extends through the shale layer 206.1 and the carbonate layer 206.2. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, generally below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 3, may then be processed and/or evaluated. Generally, seismic data displayed in static data plot 208.1 from data acquisition tool 202.1 is used by a geophysicist to determine characteristics of the subterranean formations and features. The core data shown in static plot 208.2 and/or log data from well log 208.3 are generally used by a geologist to determine various characteristics of the subterranean formation. The production data from graph 208.4 is generally used by the reservoir engineer to determine fluid flow reservoir characteristics. The data analyzed by the geologist, geophysicist and the reservoir engineer may be analyzed using modeling techniques.

Figure 4:
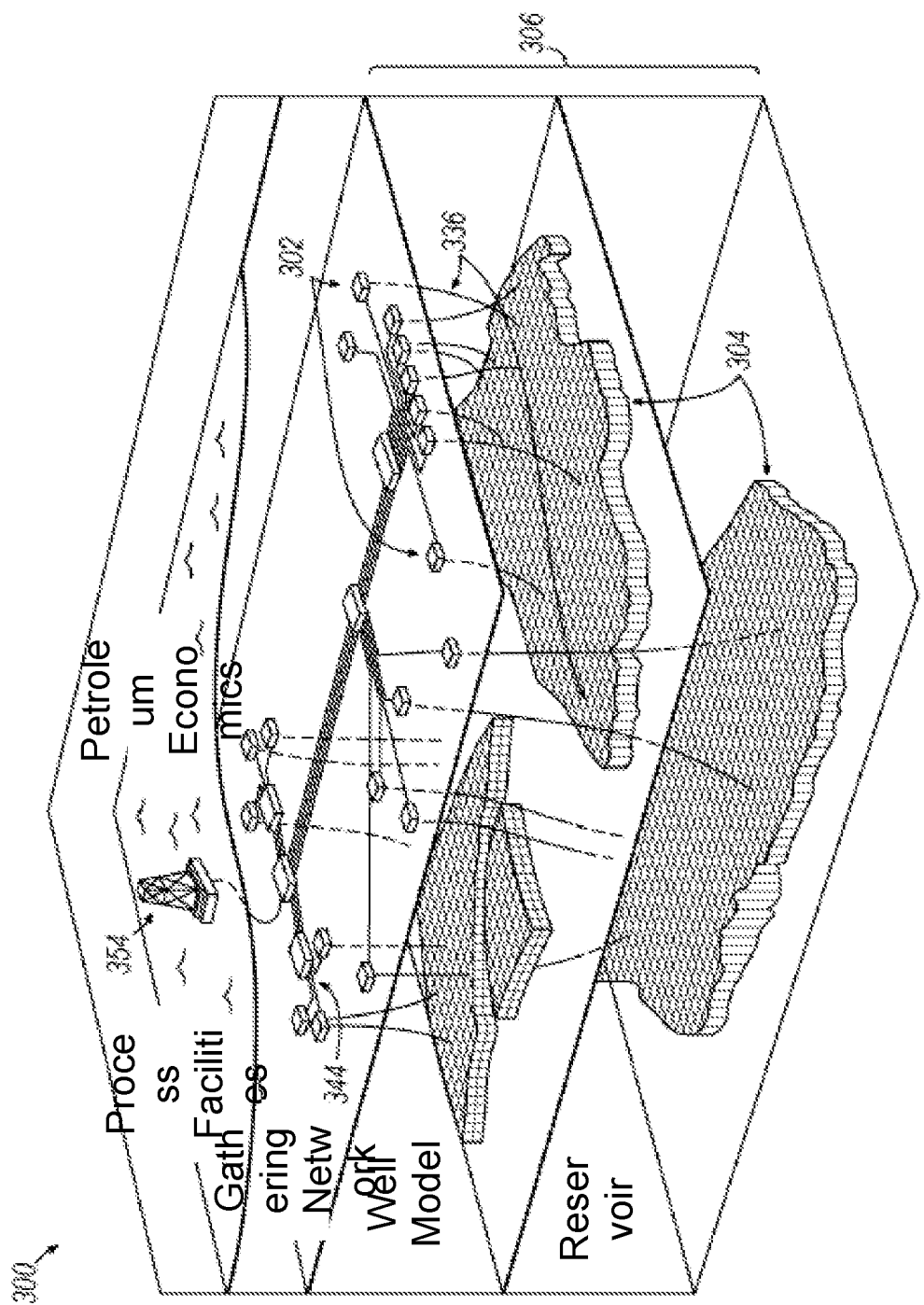
FIG. 4 illustrates a production system for performing one or more oilfield operations in accordance with implementations of various technologies and techniques described herein.

FIG. 4 illustrates an oilfield 300 for performing production operations in accordance with implementations of various technologies and techniques described herein. As shown, the oilfield has a plurality of wellsites 302 operatively connected to central processing facility 354. The oilfield configuration of FIG. 4 is not intended to limit the scope of the oilfield application system. Part or all of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Form Text Extraction of Key/Value Pairs

Form text extraction, as used herein, refers generally to the extraction and analysis of text from one or more forms in an unstructured document to generate structured data therefrom. An unstructured document, in this regard, may include one or more forms incorporating data, and for which it is desired to extract the data and characterize that data for the purposes of outputting structured data. In the illustrated embodiment, for example, an unstructured document may include multiple key/value pairs, where the key in each key/value pair represents an attribute or other description of data, and the value in each key/value pair represents the data or value that is described by the key. In addition, in the illustrated embodiment, the unstructured document may be in the form of one or more images, whereby optical character recognition may be used to recognize text within the image. In other embodiments, however, an unstructured document may include data organized in different manners, and stored in other manners (e.g., received initially in a text format).

Figures 5, 6:
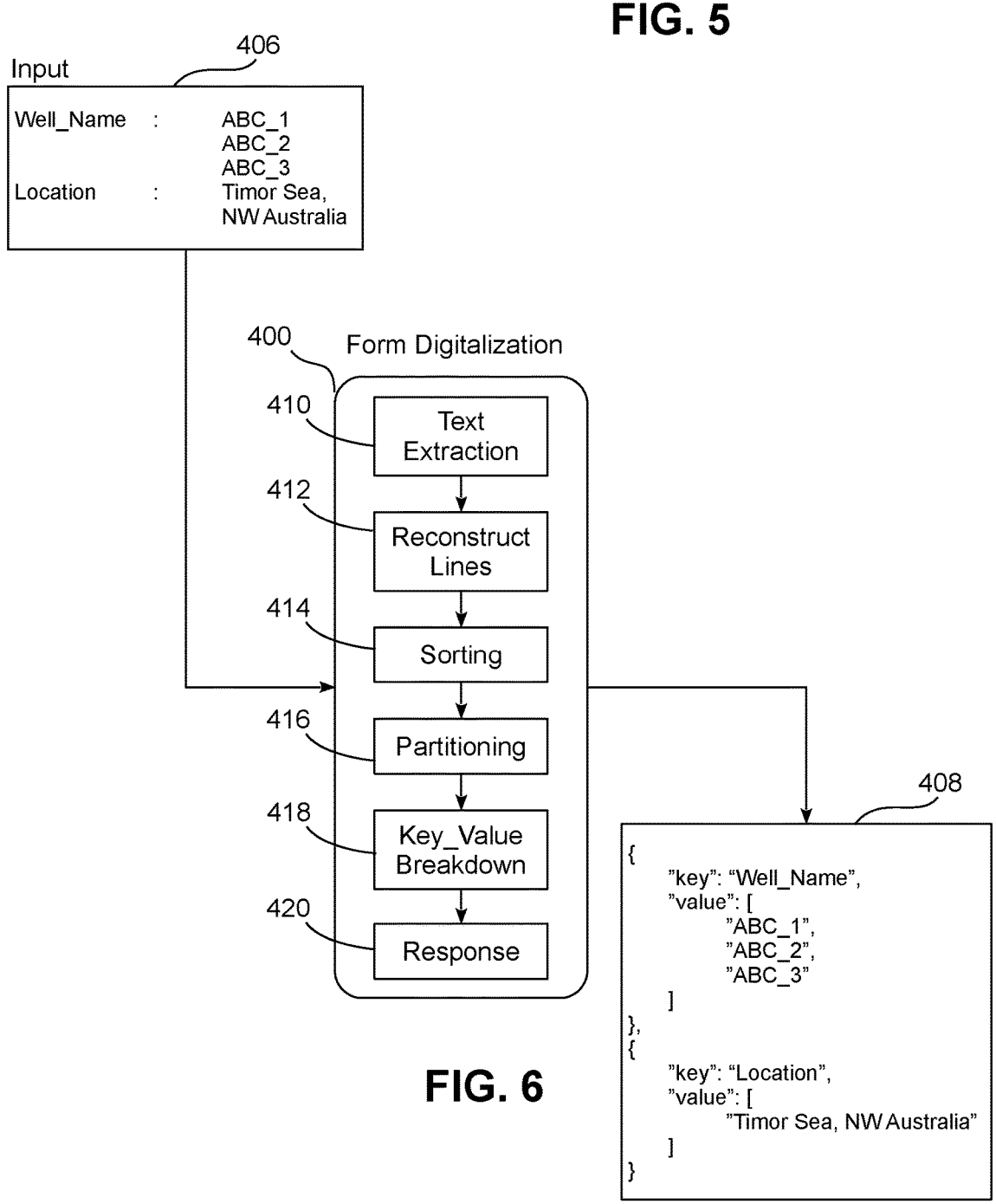
FIG. 5 illustrates a form digitalization module suitable for implementing the various technologies and techniques described herein within the data processing system of FIG. 1.
FIG. 6 is a flowchart illustrating an example sequence of operations for performing text extraction in the form digitalization module of FIG. 5.

FIG. 5, for example, illustrates an example form digitalization module 400 that may be used to process input image-based and unstructured documents such as document 402 and generate therefrom a set of key/value pairs in an output structured document 404. Module 400 may be implemented, for example, as a petro-technical module 32 of data processing system 10 in some embodiments, although it will be appreciated that the techniques described herein may be used in connection with other types of documents, other types of data representations, and other applications (e.g., applications outside of the oil & gas industry).

Digitalization module 400 may be implemented in some embodiments as a multistep process, e.g., as illustrated in FIG. 6, where an input unstructured document 406 is processed in a number of blocks 410-420 to generate an output structured document 408. Each block 410-420 may perform a logical unit of work, and module 400 may take one image as input and perform algorithmic extraction, with extracted structured information returned in the form of key/value pairs. In the example presented herein, keys represent well headers, attributes or other domain attributes of a well.

In the illustrated embodiment, for example, spatial locations of words identified in an unstructured document are used to both reconstruct lines in the unstructured document and vertically partition the unstructured document. Key/value pairs are then generated from one or more of the reconstructed lines by using one or more words to one side of the vertical partition (e.g., the left side) as keys and using one or more words to the other side of the vertical partition (e.g., the right side) as values.

Module 400, in particular, includes a text extraction block 410 that performs text detection, localization, and extraction from an input image containing form-based text. A reconstruct line block 412 restructures the extracted text into lines, and a sorting block 414 sorts the reconstructed lines both vertically and horizontally. A partitioning block 416 partitions the sorted reconstructed lines to distinguish keys from values, and a key/value breakdown block 418 extracts the key/value pairs from the partitions. A response block 420 then formulates a response including the extracted key/value pairs.

Figure 7:
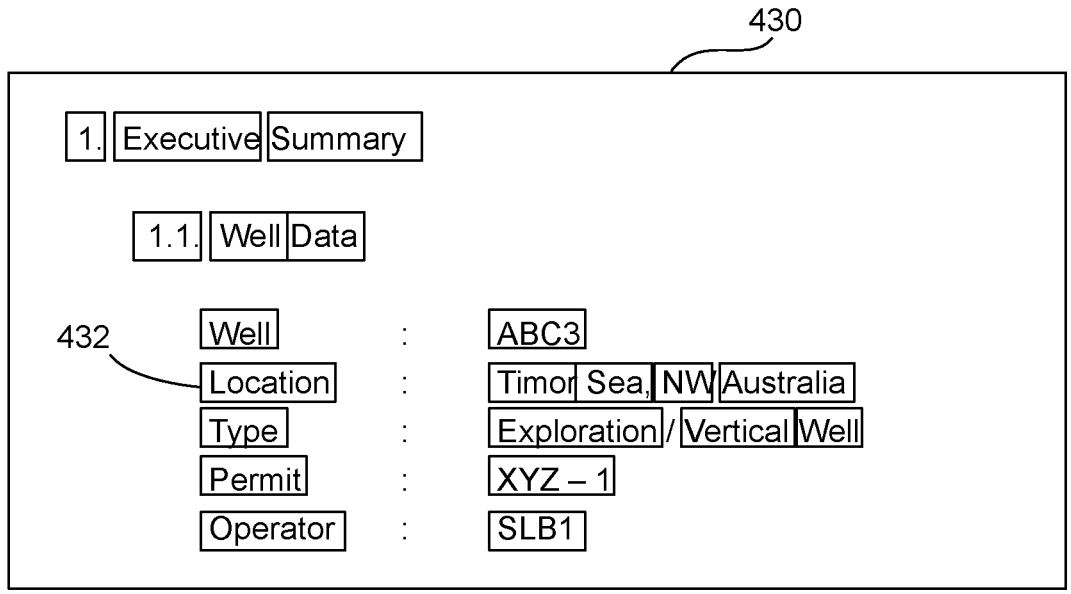

FIG. 7, for example, illustrates the operation of text extraction block 410 in greater detail. In this block, an input image 430 may be processed by an optical character recognition (OCR) API to detect, localize and extract text from the image. The response may include each word that is annotated with a bounding box 432 around it. The bounding box may be characterized by spatial coordinates representing the location and extents of the bounding box, i.e., the spatial location of the word(s) represented by each bounding box.

Figure 8:
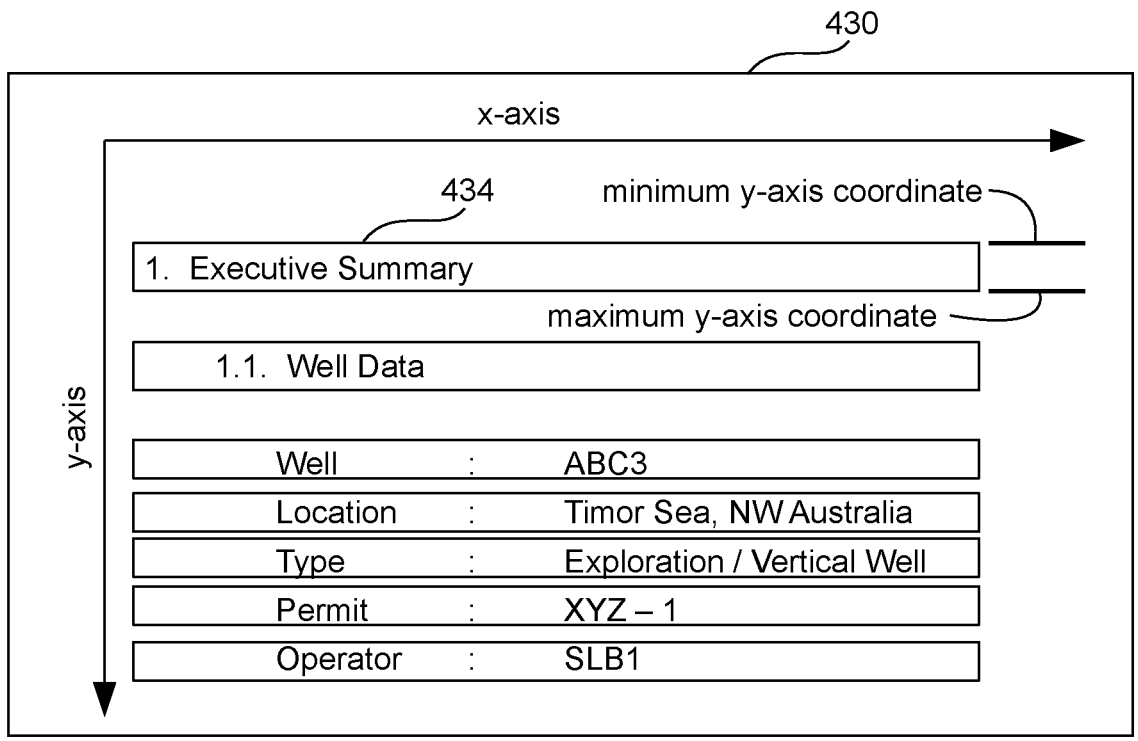
Figure 9:
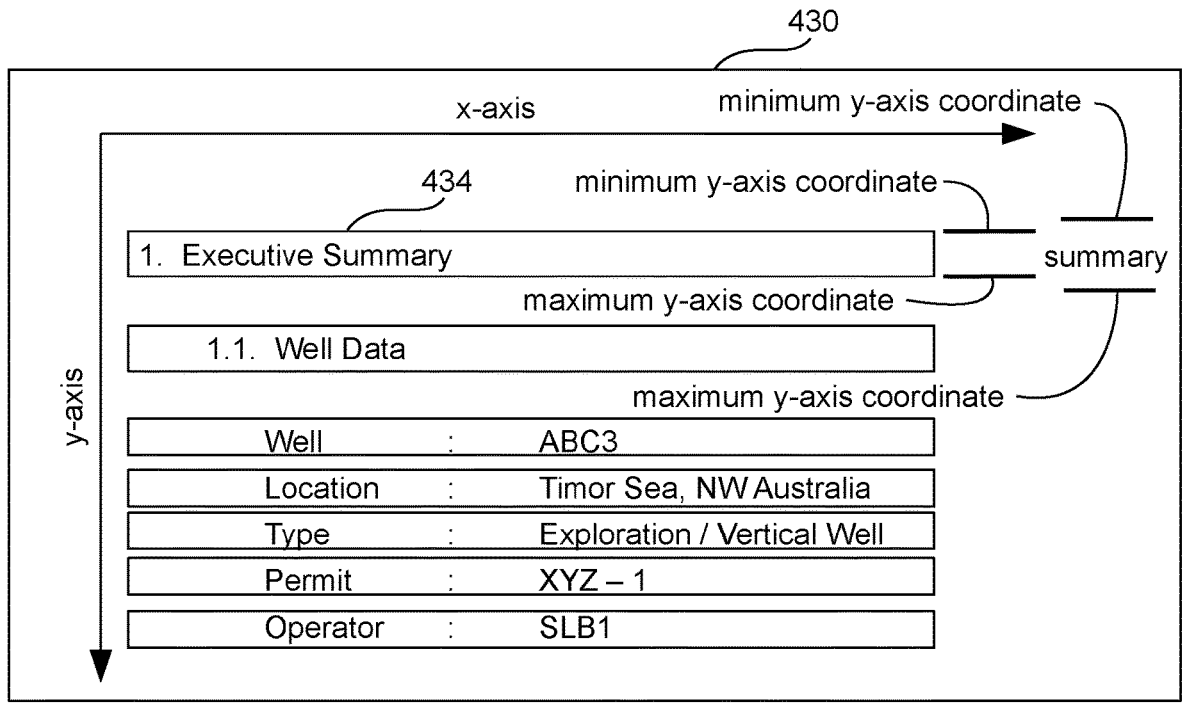
Figure 10:
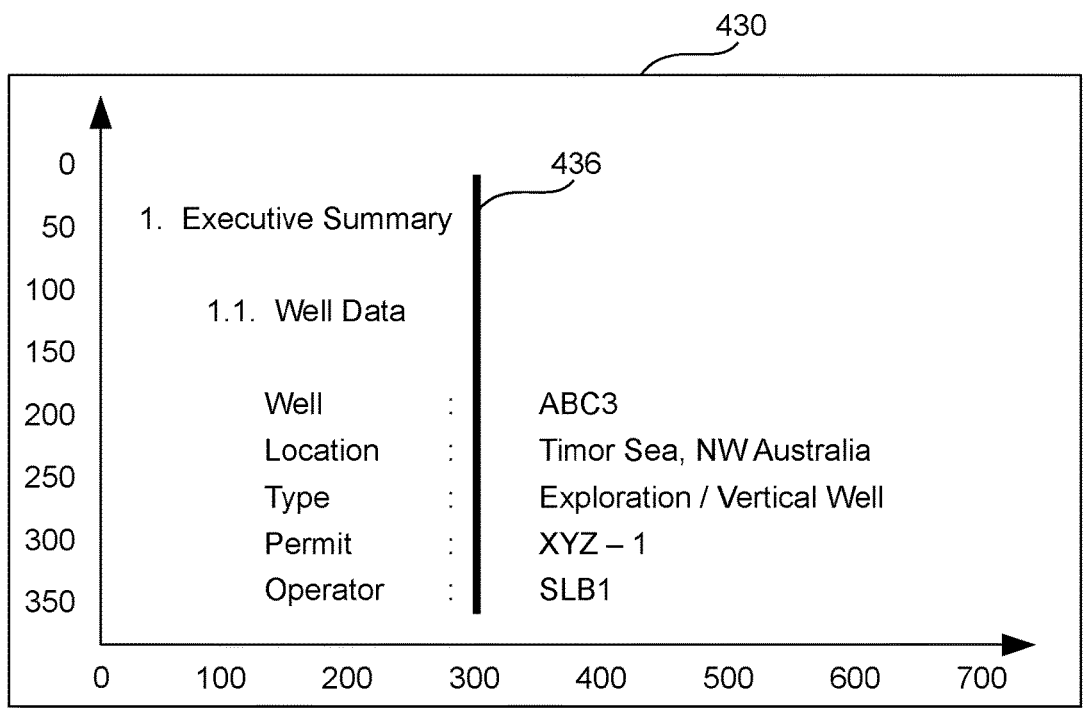
Figures 11, 12A:
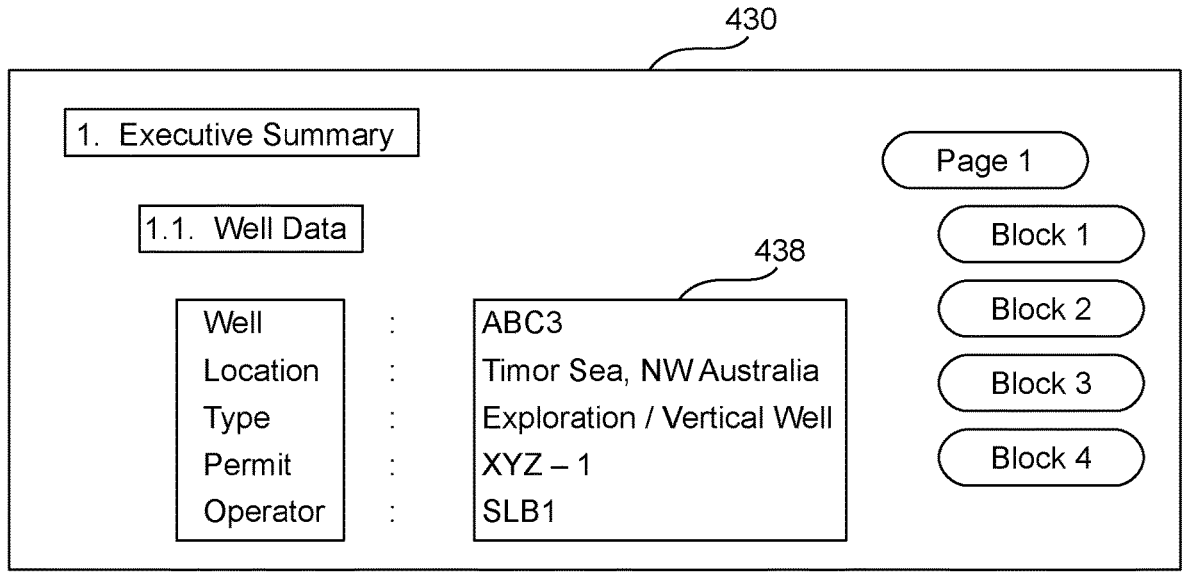
Figure 12D:
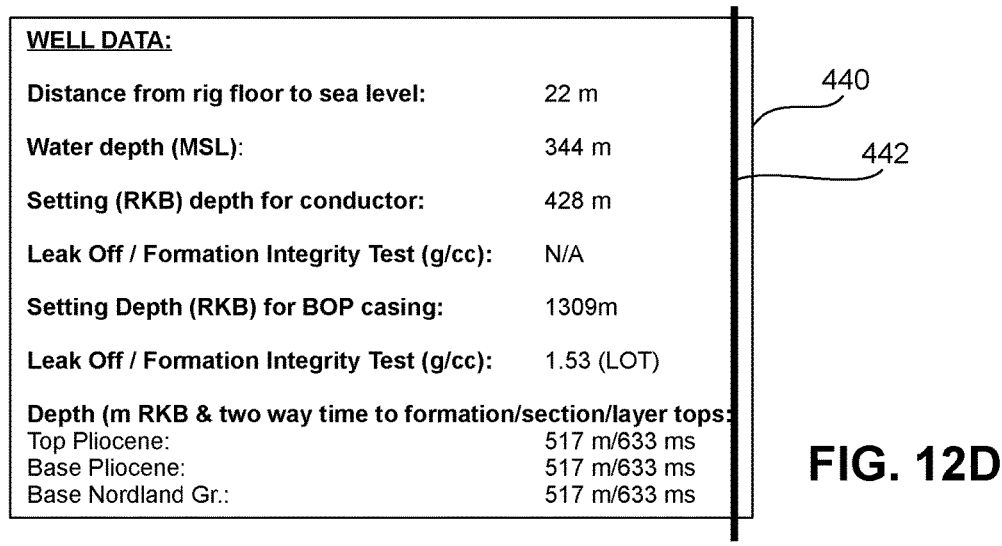

FIG. 8 next illustrates the operation of reconstruct lines block 412. In this block, the spatial coordinates of every text word may be used to recreate lines of text. In the illustrated embodiment, each line 434 may represent a group of text words that have similar vertical or y-axis coordinates (in some instances with a small confidence window around the line). Each line may be characterized with a list of words assigned to that line, a maximum y-axis coordinate from the list of words for the line, and a minimum y-axis coordinate from the list of words for the line. In the illustrated embodiment, block 412 may, for each word, traverse through a list of reconstructed lines and calculate the spatial overlap with each line. If the word has more than 50% overlap with the line, then the word may be allocated to the line. Otherwise, iteration continues through the rest of the lines. When an allocation is made, the minimum and maximum y-axis coordinates may be updated as necessary due to the newly-allocated word, e.g., by calculating the new minimum and maximum y-axis coordinates of the line from the average of minimum and maximum y-axis coordinates of the newly-allocated word and line. FIG. 9, for example, illustrates such an update.

If an allocation to an existing line fails for any particular word (e.g., due to no line existing with greater than 50% overlap), then a new line may be created with characteristics defined around the word in consideration. This process then repeats for all words found in the document.

Once the reconstruction of lines is completed, all lines have been retrieved. Each line represents a horizontal line in the input image and includes a group of one or more words, but the words are still grouped together in an unordered manner. Sorting block 414 is therefore used to recover the structure of the input document by sorting the words within each line based on their respective x-axis coordinates (horizontal positioning). Block 414 also sorts all lines based on their y coordinates, e.g., using the minimum y-axis coordinates generated for each line.

Once the lines have been reconstructed, an attempt is made to divide each line into key/value pairs in partitioning block 416 and key/value breakdown block 418. Partitioning block 416 is used to operate at the entire form level to identify a vertical line, also referred to herein as a vertical partition, that segregates the key/value pairs in the document. Block 418 then operates on each line and attempts to find the key in each line, such that the remaining content of the line may be assigned to the value for that key.

The operation of partitioning block 416 is illustrated in greater detail in FIGS. 10-14. As noted above, block 416 may operate at the form level, with a goal of finding a vertical line in the document (e.g., line 436 in document 430 of FIG. 10) that will partition the form into two parts, one side of which including all of the keys and the other side of which including all of the values.

In some embodiments, block 416 may operate by attempting to identify a vertical line where the least number of textual blocks are present (i.e., are intersected by the vertical line). Blocks may be considered to be groups of words that are closely located to each other. Each block may be characterized by a bounding box around it, e.g., as illustrated by blocks 438 in FIG. 11. In some embodiments, the OCR response from block 410 may be used to retrieve the spatial coordinates of bounding boxes of blocks.

In some embodiments, to identify the vertical partition line, an image may be traversed horizontally (e.g., from left to right on the x-axis coordinate scale), creating a vertical line in the y-axis direction at each point along the direction of traversal. An example document 440 with a vertical line 442 traversing from left to right is illustrated in FIGS. 12A-12D.

Figure 13:
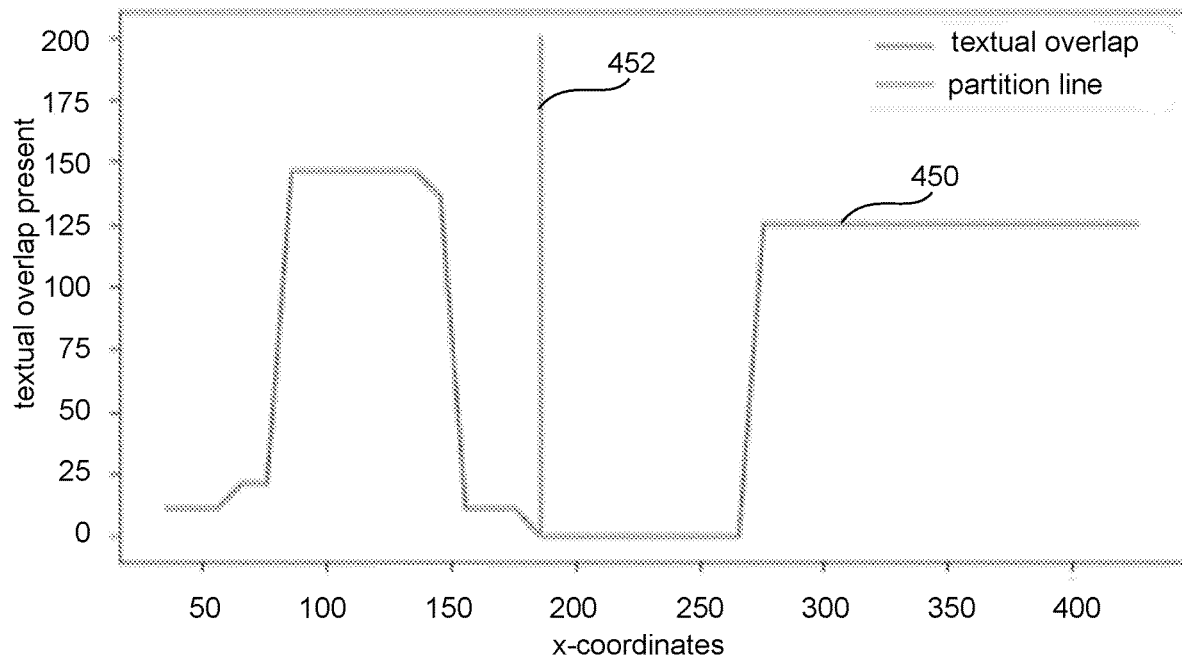

For each potential partition line, the numbers of blocks that intersect with the vertical line may be identified. In addition, to account for the sizes of the blocks, the heights of all the identified blocks that intersect with the potential partition line may be summed, such that the sum represents the amount of overlap that the potential partition line has with the text in the input image. This operation may be repeated for all potential partition lines, and in some embodiments the calculated overlap at all of the potential partition lines can be visualized using a graph such as is illustrated in FIG. 13, where the degree of textual overlap is represented by line 450, and an example partition line at a region of minimum textual overlap is represented at 452.

Figure 14:
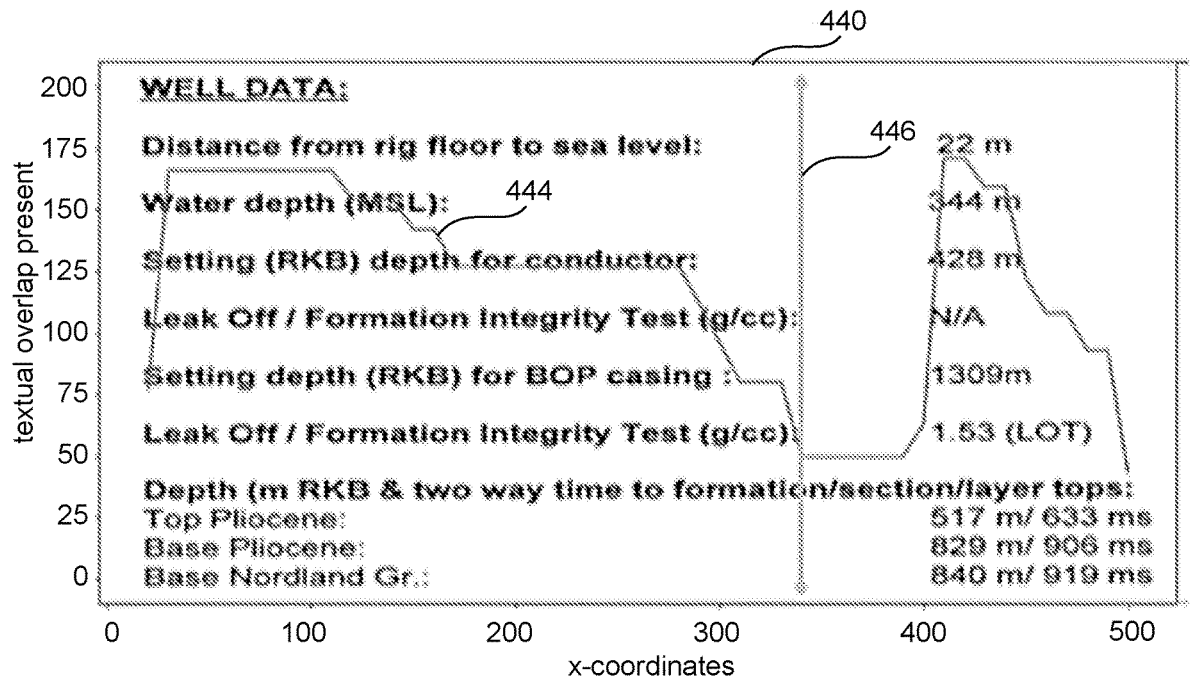

In some embodiments, it is desirable to select the line having the least amount of overlap present with a constraint that there is also a high amount of overlap on both sides of the line (to generally exclude candidate lines at the extreme left and right edges of the image). The intuition is to find a partition line between key/value content. The high overlap on the left of the partitioning line generally represents the keys and the high overlap on the right of the partitioning line represents the values. FIG. 14, for example, illustrates a graph of overlap 444 over the example document 440 of FIGS. 12A-12D, with a suitable partition line 446 at a region of minimum textual overlap. It should also be noted that partition line need not be defined at a position of no overlap, as it may be seen that in document 440 one line still overlaps line 446.

Figure 15:
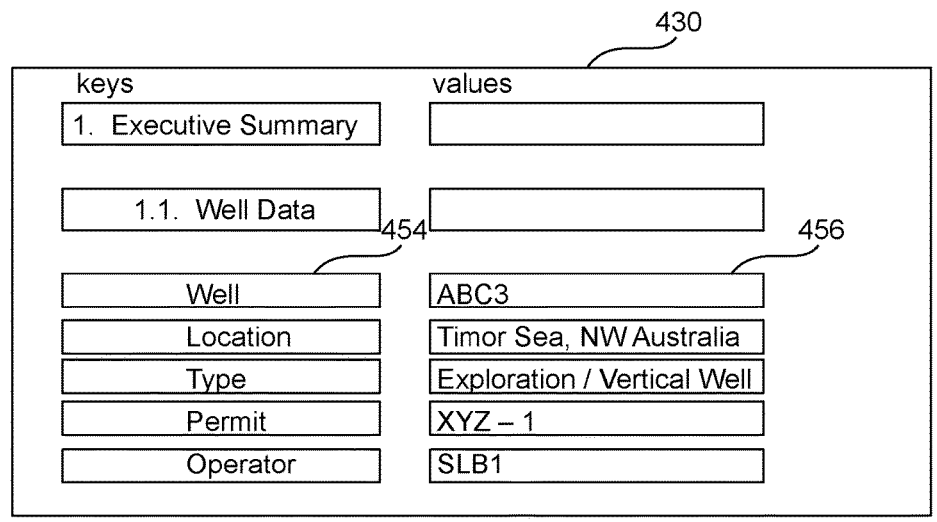

Once the partition line is selected, key/value breakdown block 418 may then be used to break each reconstructed line into a key/value pair. To identify the keys, the response of OCR API from text extraction block 410 may be used, with the intuition being that keys and values are spatially separated. Since OCR API identifies contiguous text as an entity, and key may be expected to be identified as an entity. The same would hold for all the other keys as well as for values. FIG. 15, for example, illustrates example keys 454 and values 456 generated for document 430.

In some embodiments, for each reconstructed line, a modified string-matching algorithm may be applied to match the lines against a list of entities returned in the OCR response. The intuition of the algorithm may be to find whether the line starts with any of the entities. If such an entity is found, the rest of the text of the line may be identified as a value. In addition, in some embodiments, in order to identify values that span over multiple lines, the x-axis of a line may be used to identify a starting point. If it is greater than the x-coordinate of the earlier calculated partition line, then the line may be allocated as all or a part of the value of a previously identified key/value pair.

Once key/value pairs are identified, block 420 may then write these pairs into an output file. In some embodiments, for example, the pairs may be formatted in a JSON (JavaScript Object Notation) format and returned as a response.

While particular embodiments have been described, it is not intended that the invention be limited thereto, as it is intended that the invention be as broad in scope as the art will allow and that the specification be read likewise. It will therefore be appreciated by those skilled in the art that yet other modifications could be made without deviating from its spirit and scope as claimed.

What is claimed is:

1. A computer-implemented method for extracting text from an unstructured document, the method comprising:

receiving an unstructured document including data organized into a form; and in a form digitalization module executed by at least one processing unit, performing an algorithmic extraction operation to extract from the unstructured document a plurality of key/value pairs representing the data from the form, the algorithmic extraction operation including:

determining, with a text extraction block of the form digitalization module, respective spatial locations of a plurality of words identified in the unstructured document;

reconstructing, with a reconstruct lines block of the form digitalization module, a plurality of lines from the unstructured document based upon the determined spatial locations of the plurality of words;

generating, with a partitioning block of the form digitalization module, a vertical partition for the unstructured document based upon the determined spatial locations of the plurality of words, wherein the partitioning block generates the vertical partition at a form level such that the vertical partition divides the form into first and second parts respectively representing keys and values from the form, wherein generating the vertical partition includes:

organizing the plurality of words into text blocks;

traversing the unstructured document to determine an amount of overlap of text blocks for each of a plurality of horizontal positions; and positioning the vertical partition at a horizontal position having a minimum amount of overlap, wherein at least one line of the plurality of lines includes a text block that horizontally overlaps the vertical partition when positioned at the horizontal position having the minimum amount of overlap such that the minimum amount of overlap includes at least some overlap;

generating, with a key/value breakdown block of the form digitalization module, a plurality of key/value pairs from one or more of the plurality of lines, including, for each line among the one or more lines, assigning one or more words located on one side of the vertical partition as a key for the key/value pair for the line and assigning one or more words located on another side of the vertical partition as a value for the key/value pair for the line; and generating a structured document using the plurality of key/value pairs to represent the data from the form in a structured format.

2. The method of claim 1, further comprising:

receiving the unstructured document as an image; and performing optical character recognition on the image to identify the plurality of words in the unstructured document.

3. The method of claim 1, further comprising, after reconstructing the plurality of lines, sorting the plurality of lines based upon respective vertical coordinates associated with the plurality of lines and sorting the words in each line based upon respective horizontal coordinates associated with the words in each line.

4. The method of claim 1, wherein reconstructing the plurality of lines includes processing each of the plurality of words by assigning such word to an existing line if such word vertically overlaps the existing line and creating a new line if such word does not overlap an existing line.

5. The method of claim 4, wherein reconstructing the plurality of lines includes determining a vertical coordinate for each line from the vertical coordinates of the words assigned to such line.

6. The method of claim 1, wherein the amount of overlap at each horizontal position is determined based upon a number of text blocks overlapped at such horizontal position and a vertical dimension of each overlapping text block.

7. The method of claim 1, wherein positioning the vertical partition further includes positioning the vertical partition at a horizontal position having a minimum amount of overlap and having regions of higher overlap on each side of the horizontal position.

8. The method of claim 1, wherein words located to the left of the vertical partition are keys and words located to the right of the vertical partition are values.

9. The method of claim 8, further comprising, for a line among the plurality of lines having no words located to the left of the vertical partition, assigning one or more words to the right of the vertical partition as at least a part of a value for a key/value pair for a preceding line in the unstructured document.

10. The method of claim 1, further comprising outputting the plurality of key/value pairs in a JavaScript Object Notation format.

11. An apparatus, comprising:

at least one processing unit; and program code configured upon execution by the at least one processing unit to extract text from an unstructured document by:

receiving an unstructured document including data organized into a form; and in a form digitalization module, performing an algorithmic extraction operation to extract from the unstructured document a plurality of key/value pairs representing the data from the form, the algorithmic extraction operation including:

determining, with a text extraction block of the form digitalization module, respective spatial locations of a plurality of words identified in the unstructured document;

reconstructing, with a reconstruct lines block of the form digitalization module, a plurality of lines from the unstructured document based upon the determined spatial locations of the plurality of words;

generating, with a partitioning block of the form digitalization module, a vertical partition for the unstructured document based upon the determined spatial locations of the plurality of words, wherein the partitioning block generates the vertical partition at a form level such that the vertical partition divides the form into first and second parts respectively representing keys and values from the form, wherein generating the vertical partition includes:

organizing the plurality of words into text blocks;

traversing the unstructured document to determine an amount of overlap of text blocks for each of a plurality of horizontal positions; and positioning the vertical partition at a horizontal position having a minimum amount of overlap, wherein at least one line of the plurality of lines includes a text block that horizontally overlaps the vertical partition when positioned at the horizontal position having the minimum amount of overlap such that the minimum amount of overlap includes at least some overlap;

generating, with a key/value breakdown block of the form digitalization module, a plurality of key/value pairs from one or more of the plurality of lines, including, for each line among the one or more lines, assigning one or more words located on one side of the vertical partition as a key for the key/value pair for the line and assigning one or more words located on another side of the vertical partition as a value for the key/value pair for the line; and generating a structured document using the plurality of key/value pairs to represent the data from the form in a structured format.

12. The apparatus of claim 11, wherein the program code is further configured to receiving the unstructured document as an image and perform optical character recognition on the image to identify the plurality of words in the unstructured document.

13. The apparatus of claim 11, wherein the program code is further configured to, after reconstructing the plurality of lines, sort the plurality of lines based upon respective vertical coordinates associated with the plurality of lines and sort the words in each line based upon respective horizontal coordinates associated with the words in each line.

14. The apparatus of claim 11, wherein the program code is configured to reconstruct the plurality of lines by processing each of the plurality of words to assign such word to an existing line if such word vertically overlaps the existing line and to create a new line if such word does not overlap an existing line, and wherein the program code is configured to reconstruct the plurality of lines by determining a vertical coordinate for each line from the vertical coordinates of the words assigned to such line.

15. The apparatus of claim 11, wherein the amount of overlap at each horizontal position is determined based upon a number of text blocks overlapped at such horizontal position and a vertical dimension of each overlapping text block.

16. The apparatus of claim 11, wherein the program code is configured to position the vertical partition further by positioning the vertical partition at a horizontal position having a minimum amount of overlap and having regions of higher overlap on each side of the horizontal position.

17. The apparatus of claim 11, wherein words located to the left of the vertical partition are keys and words located to the right of the vertical partition are values.

18. The apparatus of claim 17, wherein the program code is further configured to, for a line among the plurality of lines having no words located to the left of the vertical partition, assign one or more words to the right of the vertical partition as at least a part of a value for a key/value pair for a preceding line in the unstructured document.

19. A program product, comprising:

a non-transitory computer readable medium; and program code stored on the computer readable medium and configured upon execution by at least one processing unit to extract text from an unstructured document by:

receiving an unstructured document including data organized into a form; and in a form digitalization module, performing an algorithmic extraction operation to extract from the unstructured document a plurality of key/value pairs representing the data from the form, the algorithmic extraction operation including:

determining, with a text extraction block of the form digitalization module, respective spatial locations of a plurality of words identified in the unstructured document;

reconstructing, with a reconstruct lines block of the form digitalization module, a plurality of lines from the unstructured document based upon the determined spatial locations of the plurality of words;

generating, with a partitioning block of the form digitalization module, a vertical partition for the unstructured document based upon the determined spatial locations of the plurality of words, wherein the partitioning block generates the vertical partition at a form level such that the vertical partition divides the form into first and second parts respectively representing keys and values from the form, wherein generating the vertical partition includes:

organizing the plurality of words into text blocks;

traversing the unstructured document to determine an amount of overlap of text blocks for each of a plurality of horizontal positions; and positioning the vertical partition at a horizontal position having a minimum amount of overlap, wherein at least one line of the plurality of lines includes a text block that horizontally overlaps the vertical partition when positioned at the horizontal position having the minimum amount of overlap such that the minimum amount of overlap includes at least some overlap;

generating, with a key/value breakdown block of the form digitalization module, a plurality of key/value pairs from one or more of the plurality of lines, including, for each line among the one or more lines, assigning one or more words located on one side of the vertical partition as a key for the key/value pair for the line and assigning one or more words located on another side of the vertical partition as a value for the key/value pair for the line; and generating a structured document using the plurality of key/value pairs to represent the data from the form in a structured format.

\* \* \* \* \*